United States Patent

Smith et al.

[15] 3,673,432
[45] June 27, 1972

[54] DIFFERENTIAL VOLTAGE LEVEL DETECTOR WITH MICROVOLT SENSITIVITY

[72] Inventors: Emile G. Smith, Bethel; William L. Puskas, Trumbull, both of Conn.

[73] Assignee: Avco Corporation, Stratford, Conn.

[22] Filed: July 28, 1971

[21] Appl. No.: 166,874

[52] U.S. Cl. ..........................307/246, 307/238, 307/240, 307/251, 328/151, 324/98, 324/111, 340/172
[51] Int. Cl. .............G01r 17/02, H03k 17/22, H03k 17/60
[58] Field of Search ............307/238, 246, 251; 328/151; 324/98, 111, 140; 179/15 BL; 340/172, 183, 200

[56] References Cited

UNITED STATES PATENTS

| | | | |
|---|---|---|---|
| 2,798,198 | 7/1957 | Dauphinee | 324/98 X |
| 3,303,423 | 2/1967 | Staschover et al. | 324/111 X |
| 3,444,466 | 5/1969 | Lotwis, Jr. | 324/98 |

FOREIGN PATENTS OR APPLICATIONS 570,916  2/1959  Canada..................................324/111

*Primary Examiner*—Donald D. Forrer
*Assistant Examiner*—L. N. Anagnos
*Attorney*—Charles H. Hogan et al.

[57] ABSTRACT

An accurate overtemperature detector includes a system which enables the measurement of very low thermocouple voltages by detecting the difference between the thermocouple input signal voltage and an internally generated reference voltage. The detection is accomplished in a chopper-comparator which balances a millivolt thermocouple signal against an internally generated reference millivolt signal developed by a zener reference diode. In balancing the two voltage levels, one against the other, a chopped difference voltage is generated having a polarity and magnitude proportional to the difference. The difference voltage is then conditioned and applied to a decoder from which a control voltage is developed.

8 Claims, 6 Drawing Figures

INVENTORS.
EMILE G. SMITH
WILLIAM L. PUSKAS
BY
Charles M. Hogan
Harris P. Garfinkle
ATTORNEYS.

INVENTORS.
EMILE G. SMITH
WILLIAM L. PUSKAS
BY
ATTORNEYS.

DIFFERENTIAL VOLTAGE LEVEL DETECTOR WITH MICROVOLT SENSITIVITY

BACKGROUND OF THE INVENTION

There has been considerable effort in the past to develop a reliable, low cost, and miniaturized circuit which can be used to accurately measure microvolt level D-C signals such as generated by thermocouples. The ideal circuit should have, to one degree or another, all of the following features:
   a. A wide environmental temperature range.
   b. High signal sensitivity.
   c. Accuracy and stability within extremely hostile environmental conditions.
   d. Passivity in nature by not disturbing the signal which it is sensing through the introduction of noise.
   e. High input impedance in order to assure minimum signal loading.
   f. A high degree of input signal isolation from the remaining system, especially from the system common or ground.
   g. Versatility in application possibilities.
   h. The highest possible immunity from noise superimposed upon the input signal information.

The present invention has been developed for use in connection with an automotive gas turbine engine in which an engine overtemperature detection circuit was required. The design considerations required operation within environmental temperatures from −65° to +250° F. and input signal (temperature sensing) accuracy of ±5° F. or ±110 microvolts for chromel/alumel thermocouples.

OBJECTS OF THE INVENTION

It is an object of this invention to provide a detection system utilizing a chopper-comparator in which microvolt signals are compared with a microvolt reference level to generate an output having a magnitude and polarity proportional to the difference between the two microvolt levels.

Another object of this invention is to provide a detection system including a chopper-comparator circuit employing two pairs of switches which serve to chop and compare an input signal and a reference signal and to develop an output voltage having a magnitude and polarity representing the difference between said voltages.

Another object of this invention is to provide a system incorporating the foregoing chopper-comparator and developing a coded output signal which is free from noise.

THE DRAWINGS

DESCRIPTION OF THE INVENTION

Figure 1:
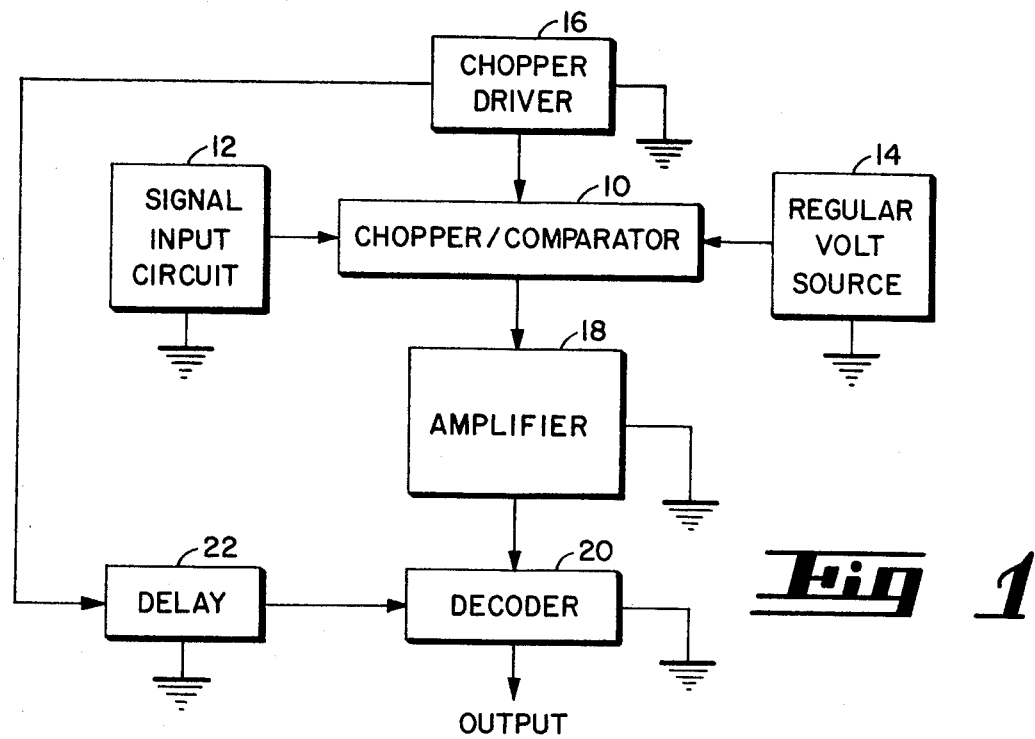
FIG. 1 is a block diagram of the invention.

Referring to the block diagram of FIG. 1, the heart of the system is a chopper-comparator 10 to which are fed a signal input voltage from a signal input circuit 12 and a reference voltage from a regulated voltage source 14. The signal input and reference voltages are both microvolt level D-C voltages.

The chopper-comparator 10 comprises a plurality of electronic switches or gates which are driven by the multivibrator output voltage of a chopper driver 16. The output of the chopper-comparator 10 is a series of direct current voltage pulses having a pulse repetition rate equal to the frequency of the chopper driver, having a magnitude proportional to the difference between the input signal and the reference voltage, and having a polarity depending on which of the two signals is greatest. The output from the comparator 10 is applied to an amplifier 18 which develops an output having a phase relationship determined by the relative magnitudes of the input signal voltage and the reference voltage. The output of the amplifier 18 is then applied to a decoder 20. The output of the decoder is derived by sampling the applied signal from the amplifier 18 at a time determined by the time constants of the delay circuit 22. As will be seen, the output signal from the decoder is noise free, and accurately represents the relationship between the input signal and the reference voltage.

Figure 2:
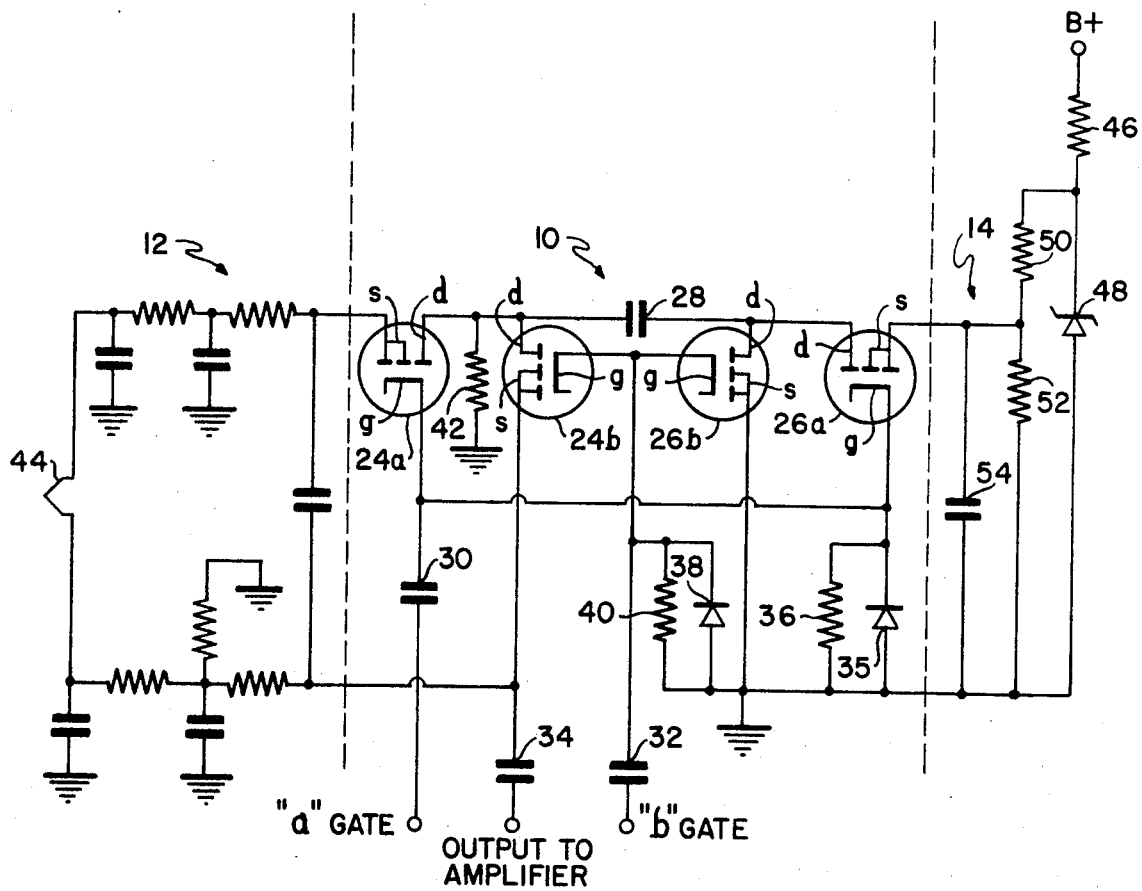
FIG. 2 is an electrical schematic of the chopper-comparator along with its signal and reference input circuits.

Referring to FIG. 2, the chopper-comparator 10 consists of two pairs of metal oxide, insulated gate, field effect transistors 24a and 26a, and 24b and 26b, each having conventional source electrodes $s$, gate electrodes $g$ and drain electrodes $d$. The drain electrodes $d$ of transistors 24a and 26a are interconnected via an A-C coupling capacitor 28, while their gates $g$ are directly interconnected. A gate pulse is simultaneously applied to both gates $g$ through a capacitor 30.

The drain electrode of transistor 24b is connected to one side of capacitor 28 while the drain electrode of transistor 26b is connected to the other side of capacitor 28. The gate electrodes $g$ of transistors 24b and 26b are directly interconnected and are simultaneously supplied with a gate voltage through capacitor 32.

The output from the comparator 10 is derived via A-C coupling capacitor 34 from the source electrode of transistor 24b referenced to the source electrode of transistor 26b which is common to the circuit reference ground. A diode 35 and a resistor 36 connected between the gate electrodes of transistors 24a and 26a, and a diode 38 and a resistor 40 connected between the gate electrodes of transistors 24b and 26b provide a negative clamping voltage on the gate of each transistor in order to assure biasing of the gates and to cut off the respective transistors during the nonconducting portion of the cycle. A resistor 42 is connected between the drain electrode of transistor 24a and ground for the purpose of bleeding off any leakage current and static charge from transistors 24a and 24b.

The signal conditioning input circuit 12 comprises a conventional resistance-capacitance filter and serves to couple the D-C voltage output of a thermocouple 44 to the source electrode of transistor 24a. The reference voltage is supplied from a conventional B+ supply through a resistor 46 to a zener diode 48. The regulated output of the zener diode 48 is voltage divided by means of resistors 50 and 52 and is supplied to the source electrode of transistor 26a, the capacitor 54 providing an A-C bypass to ground for noise limiting.

The gates of the transistors 24a, 26a and 24b, 26b are driven with a fast rise time chopper drive signal, but the drive applied to the $a$ transistors is 180° out of phase with the drive applied to the transistors 24b and 26b. Thus, the $a$ transistors are open when the $b$ transistors are closed and vice versa.

The chopper-comparator circuit 10 operates by balancing the millivolt signal output from the thermocouple 44 against the reference millivolt level developed by the zener diode 48. In balancing the two voltages, one against the other, a difference voltage is generated. The polarity and magnitude of the resultant of the opposing voltages defines whether the thermocouple or the reference voltage is the larger, and by how much.

The operation of the circuit shown in FIG. 2 can best be explained by reference to the simplified equivalent circuit shown in FIG. 3 and to the curves in FIG. 4. This circuit shows the chopper-comparator in simple form, substituting switches 1a and 2a for the transistors 24a and 26a, and switches 1b and 2b for the transistors 24b and 26b, respectively. This substitution assumes that the field effect transistors are perfect switches. In fact, the electrical continuity or impedance between the drain and the source is a function of the magnitude of the chopper gate drive voltage referenced to the source termination. This impedance can range from as low as 200 ohms in the "on" state to $10^7$ ohms in the "off" state.

Figure 3:
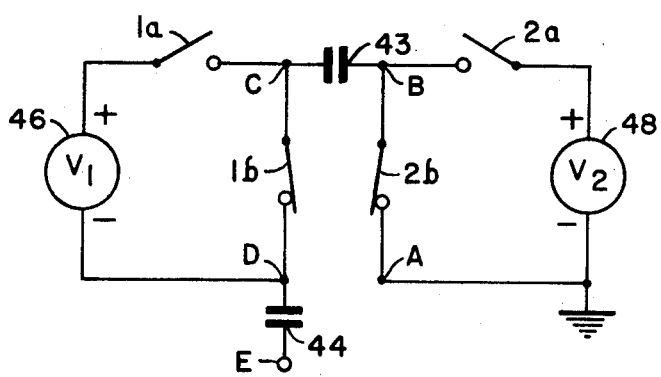
FIG. 3 is a simplified equivalent circuit for showing the principle of operation of FIG. 2.

Referring to FIG. 3, we can see that the following equation will define the output voltage waveform magnitude at any point in time. The output is taken between point E (equivalent to the voltage at capacitor 34) and point A (ground).

$$V_{A/E} = V_{A/B} + V_{B/C} + V_{C/D} + V_{D/E} \qquad \text{(Eq. 1)}$$

Figure 4:
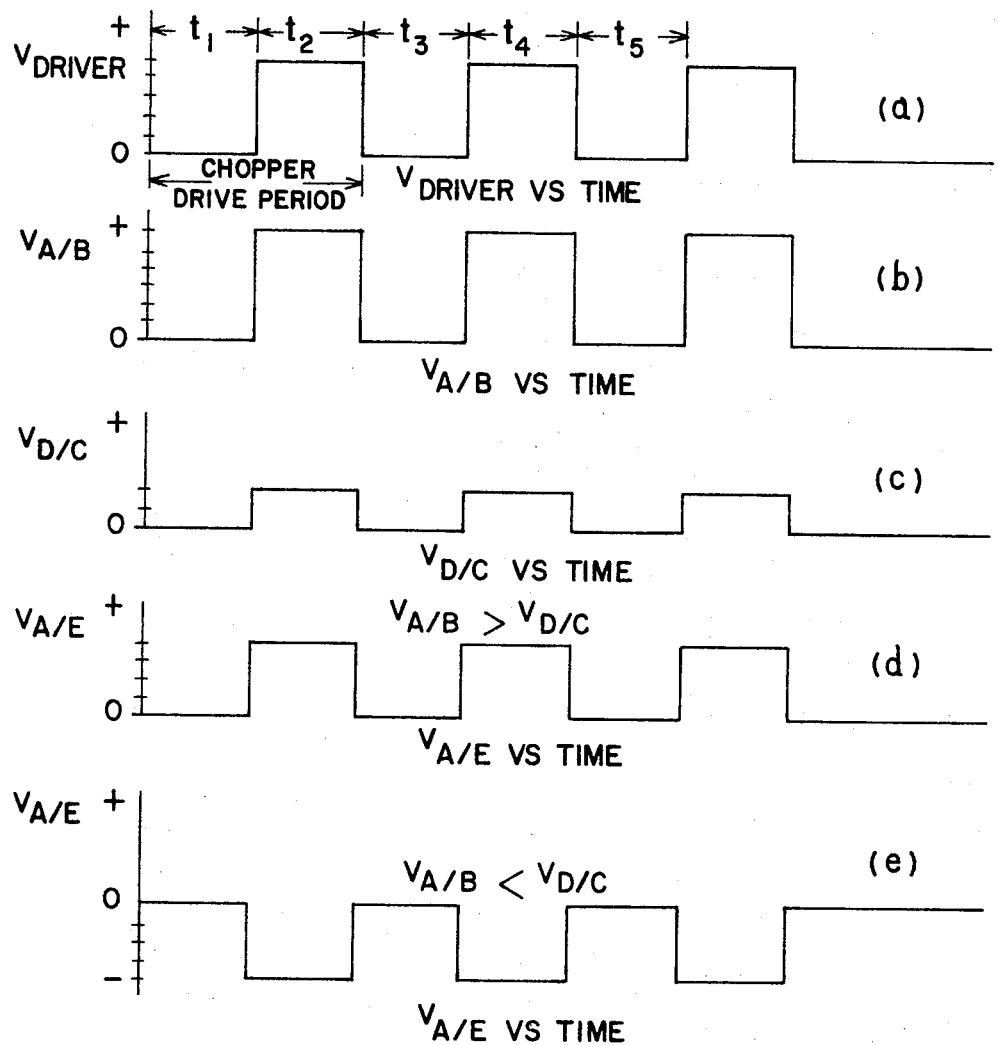
FIG. 4 is a series of curves showing the input and outputs developed from the circuit of FIG. 2.

In FIG. 4, the curve A represents the chopper driver output. If during period $t_1$ the switches are in the condition shown in FIG. 3, with the $a$ switches open and the $b$ switches closed, the voltage at $V_{A/B}$ and $V_{C/D}$ will be 0 since the voltage sources $V_1$ and $V_2$ are not connected.

If it is assumed that the capacitors 43 and 44 are essentially short circuits to a time varying voltage and that they do not remove any amplitude from the signal, then the voltage between point E and ground is simplified to $$V_{A/E} = +V_{A/B} + (0) + V_{C/D} + (0) = V_{A/B} + V_{C/D} \qquad \text{(Eq. 2)}$$

or $$V_{A/E} = V_{A/B} - V_{D/C} \qquad \text{(Eq. 3)}$$

which equals zero for this first case.

When the $a$ switches close and the $b$ switches open during period $t_2$, the voltages $V_1$ and $V_2$ appear across switches $1b$ and $2b$, respectively. The resultant output voltage is again defined by equation 3, but in this case $V_{A/B} = V_2$ and $V_{D/C} = V_1$ so that the output voltage is the difference voltage, $\Delta V = V_2 - V_1$, and is shown in curve D.

We can then have the following three conditions:

$$V_{A/B} = V_{D/C} \quad \Delta V = 0 \qquad \text{(Eq. 4)}$$
$$V_{A/B} > V_{D/C} \quad \Delta V = +V \qquad \text{(Eq. 5)}$$
$$V_{A/B} < V_{D/C} \quad \Delta V = -V \qquad \text{(Eq. 6)}$$

Thus, during periods $t_1$ and all subsequent odd cycles, the resultant output is zero volts since the $b$ switches act as shorts across the inputs and the $a$ switches open circuited. This zero voltage level acts as the electrical base or reference to which all the other signals are compared. During period $t_2$ and all subsequent even cycles, the output information is a pulse whose magnitude and polarity are defined by equations 4–6. If $V_2$ represents the reference level and $V_1$ represents the thermocouple signal, then where $V_{A/B} > V_{D/C}$ (Equation 5) the thermocouple signal is below the reference level and hence below the overtemperature condition. In such a case the output pulse is positive going, as shown in curve $d$ of FIG. 4. Where $V_{A/B} = V_{D/C}$ (Equation 4), the output voltage has zero magnitude since the two voltages are equal and of opposite polarity and cancel each other. This is the situation where the thermocouple temperature is just at the overtemperature point. Where an overtemperature condition exists, Equation 6 applies, and the output pulses are negative going, as shown in curve $e$ of FIG. 4, and it is this negative polarity or swing that is used to provide the overtemperature information.

The chopper drive is a square wave voltage as shown in curve $a$, FIG. 4, and it is capacitively coupled into the gates of the transistors through the capacitors 30 and 32. As previously noted, the diode-resistor combinations 35, 36 and 38, 40 connected from the gates to ground insure a negative clamping voltage on the gate of each transistor during the odd numbered time intervals. This serves to isolate the transistor gates from any static or leakage positive offset voltage that might exist on the chopper drive gates during these intervals and to insure that during this "zero" voltage period the $a$ transistors are kept nonconducting by the application of this negative bias.

Ideally, the output from the chopper 10 is a pure square wave as illustrated in curves $d$ and $e$ in FIG. 4. As a practical matter, the output from the chopper contains positive and negative spikes at the trailing and leading edges as shown in curves $a$, $b$, and $c$ in FIG. 6. The spikes occur at each switching point and the magnitude of the spikes is constant for any given circuit since it is a function of distributed inductance and not of the input or output signal amplitude. In order to avoid inaccuracies due to the presence of these spikes, the delay circuit 22 only allows the decoder to sample the output of the chopper-amplifier at the midpoint of the cycle.

The output from the chopper is applied through capacitor 34 through the amplifier 18 to the decoder 20. The amplifier 18 is conventional and many other configurations may be used so long as they provide the proper number of stages for phase change in increments of 180° to agree with the decoding logic, and so long as they exhibit the following characteristics:

a. The amplifier must have a minimum gain commensurate with the circuit design accuracy requirements.
b. It must have reasonable stability over temperature.
c. It must have moderate input impedance so as to prevent signal loading.
d. It must have sufficient power gain to perform its end function.

Figure 5:
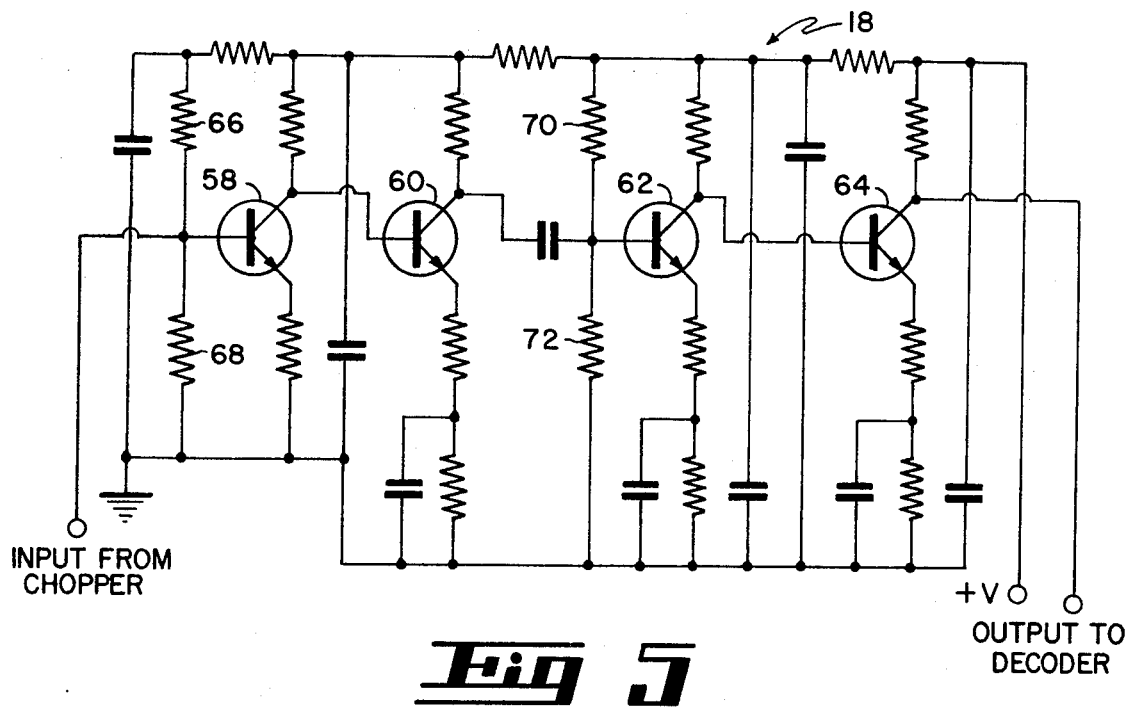
FIG. 5 is an electrical schematic of the amplifier.

Such an amplifier is illustrated in FIG. 5.

The amplifier 18 consists of four transistor amplifying stages 58, 60, 62 and 64. The stages 58, 60 and 62, 64 are direct coupled, while stages 60 and 62 are capacitively coupled. The bases of transistors 58 and 62 are biased by means of a direct connection to voltage dividing resistors 66, 68 and 70, 72, respectively. The inputs to the transistor stages 60 and 64 are biased by the amount of D-C voltage appearing at the collectors of transistors 58 and 62, respectively.

Figure 6:
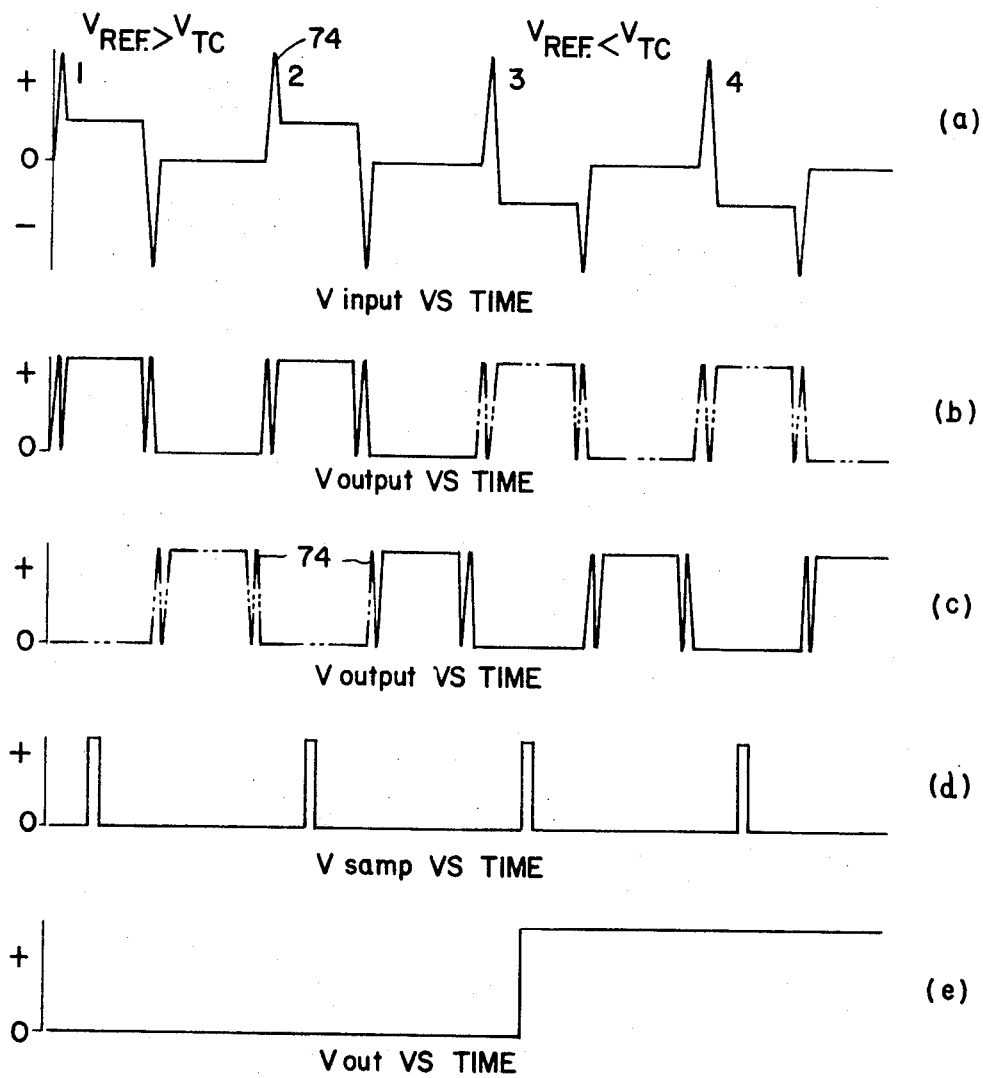
FIG. 6 is a series of curves showing the overall operation of the system.

The pulsating current signal input to the amplifier 18 is shown in the curve a in FIG. 6, cycles 1 and 2 representing a positive going, undertemperature signal, cycles 3 and 4 representing a negative going overtemperature condition. The signal is applied to the base of the transistor 58 where it is amplified and then applied to the base of transistor stage 60 for further amplification. The output wave shape from the transistor stage 60 is identical to the input to stage 58 except that it has been amplified. The output waveform from transistor 60 is therefore as shown in the curve $a$ of FIG. 6 when $V_{REF} > V_{TC}$. When the amplified signal is thereafter coupled into amplifier stage 64, the resultant is a pulse train, where the coincidence between the sampling pulse and a positive going output signal is determined by the relative magnitude of the two input signals. If the input pulses are positive, as in cycles 1 and 2 of curve $a$, then the amplifier output pulses are also positive, as shown in curve $b$, and in phase with the sampling pulse shown in curve $d$. However, if the input pulses are negative, as in cycles 3 and 4 of curve $a$, then the output pulses are still positive but are out of phase with the sampling pulse by 180° as indicated in the curve $c$. The output from the amplifier 18 is then phase coded and it is then applied to the decoder 20 for coincidence detection and development of an output signal.

The chopper driver 16 is a conventional multivibrator capable of delivering a rectangular wave form. Its characteristics are such that the $a$ transistors are driven 180° out of phase from the $b$ transistors. Preferably the chopper driver 16 has fast rise and fall times to assure that there will be little or no "on" or "off" time overlapping, to avoid as much as possible the generation of large spikes on the signal output due to the distributed inductance in the chopper-comparator circuit 10. The output from the chopper drive 16 has a voltage amplitude sufficient to assure the lowest reasonable "on" impedance of the transistors 24a, 24b, 26a and 26b so as to minimize voltage drop error.

In practice, an integrated circuit flip-flop was used. The flip-flop exhibited rise and fall times in the order of 40 nano seconds with a minimal overlap of 20 nano seconds between the two phase outputs, but spikes 74 were still present on the output especially as sensitivity was increased. The effect of the spikes 74 was eliminated by the decoder 20 in combination with the time delay 22.

Referring to FIG. 6, the output of the comparator is shown in curve $a$. The output pulses of the amplifier 18 are shown in curves $b$ and $c$, the pulses of curve $b$ representing the output due to the positive going input pulses of cycles 1 and 2 of curve $a$, while curve $c$ represents the output due to the negative going pulses of cycles 3 and 4 of curve $a$. It will be seen that there has been a phase shift of 180° in the transitioning from the positive state to the negative state; i.e., curve $b$ is phase shifted 180° from curve $c$.

All the pulses are then presented to the decoding flip-flop, where they are sampled for short periods, the sampling pulse (curve *d*) is derived from the chopper driver 16, but delayed by selected time constants so that the sampling pulse falls at some point near the middle of the output pulse, thus avoiding the spikes 74 and preventing the spike distortion effects. At the sampling command, the decoder looks at the status of the output signal which will be either zero or some value of +V. Where the sample pulse is applied during the occurrence of the positive going pulses of cycles 1 and 2 of curve *a* (where the reference voltage is greater than the thermocouple voltage) the decoder sees a +V voltage level and in turn assumes a zero level at its output. When the sampling pulse is applied during the occurrence of the negative going pulses of cycles 1 and 2 of curve *a* (where the reference voltage is less than the thermocouple voltage) the decoder sees a zero level and assumes a +V level on its output (curve *e*). This output may then be used to drive a suitable protective circuit (not shown).

SUMMARY

The described system is capable of measuring microvolt level differentials and has been successfully used for sensing overtemperature conditions in a gas turbine engine. The circuit has demonstrated wide environmental temperature capabilities, good stability, superior accuracy and repeatability. Various modifications and variations can be made in order to further adapt the systems to a wide variety of uses in various electronic systems. The system lends itself to many forms of packaging dependent upon the basic design requirements.

We claim:
1. The combination comprising:
   a microvolt level direct current signal source having first and second terminals;
   a microvolt level direct current reference source having first and second terminals;
   first and second electronic switches connected in series between the first terminals of said sources;
   third and fourth electronic switches connected across said first source and said first switch, and said second source and said second switch, respectively;
   means for repetitively opening and closing said switches, said first and second switches being simultaneously closed when said third and fourth switches are simultaneously open, and said first and second switches being simultaneously open when said third and fourth switches are simultaneously closed; and
   an output circuit connected between the second terminals, whereby the output voltage applied to said output circuit has one polarity when the voltage of said reference source is greater than the voltage of said signal source, and has the opposite polarity when the voltage of said reference source is less than the voltage of said signal source.
2. The invention as defined in claim 1 and a coupling capacitor connected in series between said first and second switches.
3. The invention as defined in claim 2 wherein said switches are solid state devices, each having an input electrode, an output electrode and a control electrode; and
   wherein the means for repetitively opening and closing said switches comprises a source of control voltage connected to said control electrode, the impedance between said input and output electrodes being low when said control voltage is high, and being high when said control voltage is low.
4. The invention as defined in claim 3 wherein said source of control voltage is a control voltage generator having a square wave output.
5. The invention as defined in claim 4 wherein said output circuit comprises means for amplifying said compared signal output wherein the amplified signal is phase shifted by 180° whenever said output voltage is said one polarity.
6. The invention as defined in claim 5 and means for sampling said output voltage during a given half cycle of said square wave.
7. The invention as defined in claim 6, and means for delaying the time of the sampling of said output voltage to a time occurring approximately at the center of said half cycle of said square wave.
8. The invention as defined in claim 7, wherein said signal source is a thermocouple and said reference source is the voltage derived from a zener diode.

* * * * *